US012676136B2

(12) United States Patent
Geyer et al.

(10) Patent No.: US 12,676,136 B2
(45) Date of Patent: Jul. 7, 2026

(54) METHOD AND SYSTEM FOR ACTIVE NOISE CANCELLATION

(71) Applicant: Airbus SAS, Blagnac (FR)

(72) Inventors: Fabien Geyer, Taufkirchen (DE); Svetoslav Duhovnikov, Taufkirchen (DE); Dominic Schupke, Taufkirchen (DE); Sandra Hoppe, Taufkirchen (DE); Aygün Baltaci, Taufkirchen (DE)

(73) Assignee: Airbus SAS, Blagnac (FR)

( * ) Notice: Subject to any disclaimer, the term of this patent is extended or adjusted under 35 U.S.C. 154(b) by 175 days.

(21) Appl. No.: 18/573,020

(22) PCT Filed: Jun. 21, 2022

(86) PCT No.: PCT/EP2022/066790

§ 371 (c)(1),
(2) Date: Dec. 21, 2023

(87) PCT Pub. No.: WO2022/268754

PCT Pub. Date: Dec. 29, 2022

(65) Prior Publication Data

US 2024/0296824 A1 Sep. 5, 2024

(30) Foreign Application Priority Data

Jun. 23, 2021 (EP) .................................... 21181075

(51) Int. Cl.
*G10K 11/178* (2006.01)

(52) U.S. Cl.
CPC .. *G10K 11/17854* (2018.01); *G10K 11/17825* (2018.01); *G10K 2210/1281* (2013.01)

(58) Field of Classification Search
CPC .............................................. G10K 2210/1281
See application file for complete search history.

(56) References Cited

U.S. PATENT DOCUMENTS 4,829,590 A * 5/1989 Ghose .............. G10K 11/17823 381/71.8
9,646,597 B1 5/2017 Beckman et al.
10,453,473 B2 10/2019 Whittaker et al.
2019/0108827 A1 4/2019 Konishi et al.
(Continued)

OTHER PUBLICATIONS

J. Pan, et al., "Active Noise Control in Workplaces" Australian Acoustical Society 2015, retrieved online from https://doi.org/10.1007/s40857-015-0035-2 on Dec. 10, 2015; 6 pages.
(Continued)

*Primary Examiner* — Ping Lee
(74) *Attorney, Agent, or Firm* — Greer, Burns & Crain, Ltd.

(57) ABSTRACT

An active noise cancellation method and system in which the noise generation platform records noise data with an array of microphones and sends that noise data to a noise cancellation processing system. The noise data is converted to counterwave sound data that are again converted by stationary loudspeaker arrays into sound counterwaves with the potential to eliminate or at least reduce the noise from the noise generation platform. The noise generation platform may be an aerial vehicle or a ground vehicle, such as a high-speed train.

12 Claims, 1 Drawing Sheet

(56) References Cited

U.S. PATENT DOCUMENTS

2019/0340933 A1 11/2019 Villa et al.

OTHER PUBLICATIONS

R. T. Bambang, et al., “Active Noise Control in Free Space Using Recurrent Neural Networks with EKF Algorithm” Journal of Control and Intelligent Systems, vol. 36, No. 3, 2008; 11 pages.
S. M. Kuo, et al., “Active Noise Control: Open Problems and Challenges” 1st International Conference on Green Circuits and Systems, ICGCS 2010, Department of Electrical Engineering, Northern Illinois University and School of Electrical and Electronic Engineering, Nanyang Technological University; pp. 164-169.
I. T. Ardekani et al., “Adaptive Active Noise Control in Free Space” 2013 Asia-Pacific Signal and Information Processing Association Annual Summit and Conference, Kaohsiung, 2013, Computing Department Unitec Institute of Technology, Auckland, New Zealand and Electrical and Computer Engineering Department of the University of Auckland, New Zealand; pp. 1-4.
International Search Report and Written Opinion for corresponding International Patent Application No. PCT/EP2022/066790 dated Sep. 12, 2022; priority document, 22 pages.
Sheng Shen et al., “MUTE: bringing IoT to noise cancellation” Proceedings of the 2018 Conference of the ACM Special Interest Group on Data Communication Aug. 7, 2018, New York, NY (USA), pp. 282-296; retrieved from the Internet: https://synrg.csl.illinois. edu/papers/mute-sigcomm18.pdf.

* cited by examiner

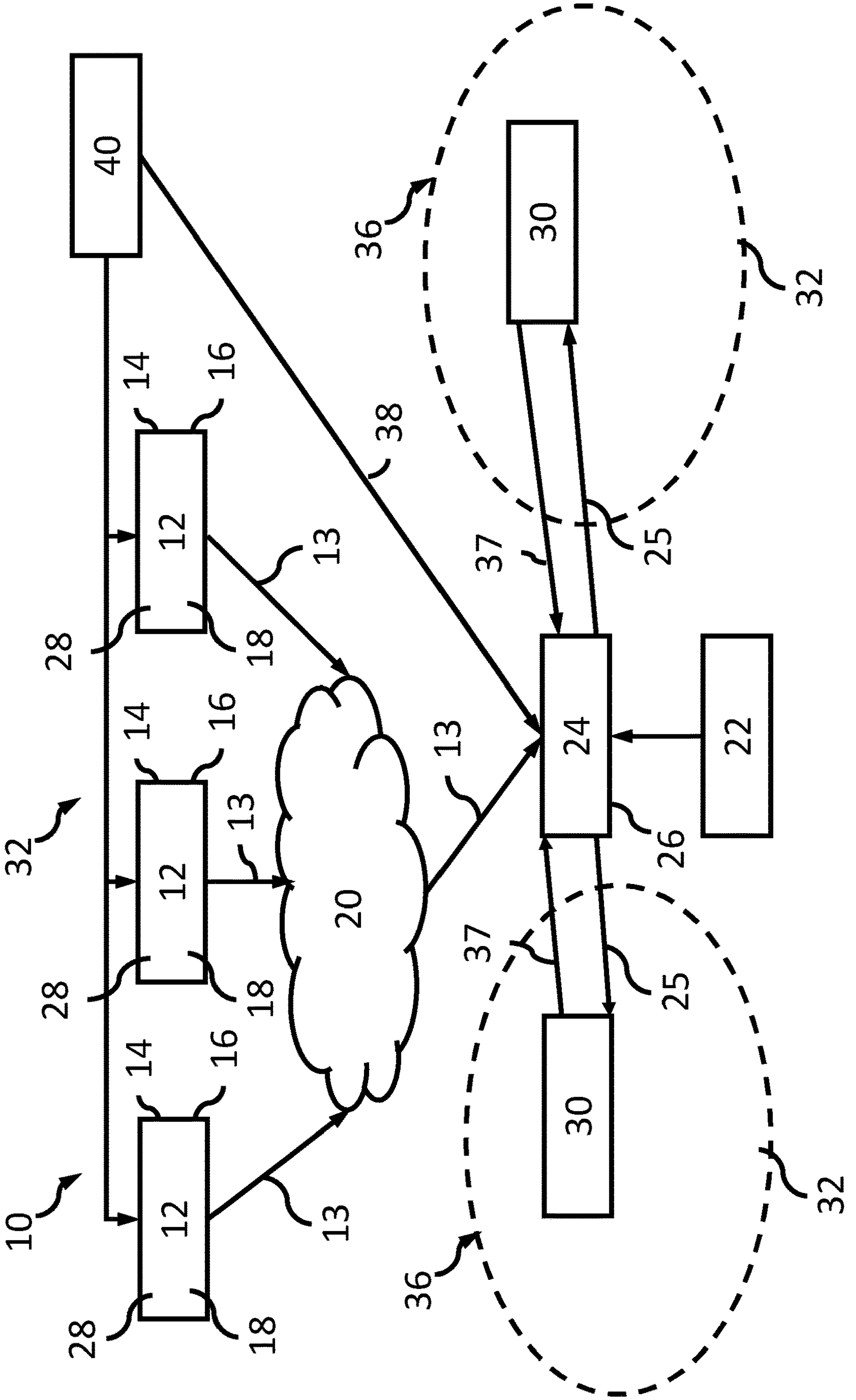
40
30
36
32
14
16
12
38
13
37
25
28
18
24
22
20
26
10

METHOD AND SYSTEM FOR ACTIVE NOISE CANCELLATION

CROSS-REFERENCES TO RELATED APPLICATIONS

This application is a national phase of International Patent Application No. PCT/EP2022/066790, filed on Jun. 21, 2022, which claims the benefit of European Patent Application No. 21 181 075.9, filed on Jun. 23, 2021, the entire disclosures of which are incorporated herein by way of reference.

FIELD OF THE INVENTION

The invention relates to a method and a system for active noise cancellation.

BACKGROUND OF THE INVENTION

Current scenarios for Urban Air Mobility (UAM) target use of flying taxis and related flying vehicles in urban environments. Due to their current propulsion systems, flying taxis may generate lots of noise at their different phases of flight, namely during take-off, cruise, and landing. In order to reduce the impact of noise disturbance near the infrastructure for take-off and landing (e.g. vertiports) as-well-as during flight over cities, noise reduction methods may be used. In their current design, those noise reduction methods usually only work well on lower frequencies due to the short processing time available to generate cancelling acoustic waves. In order to assist and improve those noise reduction methods, additional information about the noise generating object(s) can be used (e.g. position, speed, rotors speed, etc.). This method can also be applied for other noise generating vehicles, such as high speed trains.

Reference is made to the following prior art documents:

[1] "MUTE: Bringing IoT to Noise Cancellation", Sheng Shen, Nirupam Roy, Junfeng Guan, Haitham Hassanieh, Romit Roy Choudhury, Proceedings of the 2018 Conference of the ACM Special Interest Group on Data Communication

[2] Pan, J., Paurobally, R. and Qiu, X., Active Noise Control in Workplaces. *Acoust Aust* 44, 45-50 (2016). https://doi.org/10.1007/s40857-015-0035-2

[3] Bambang, R. T., Uchida, K., Yacoub, R. R., Active Noise Control in Free Space using Recurrent Neural Networks with EKF Algorithm, *Journal of Control and Intelligence Systems,* 2008.

[4] Kuo, Sen & Kuo, Kevin & Gan, Woon-Seng. Active noise control: Open problems and challenges. 1st *International Conference on Green Circuits and Systems*, ICGCS 2010. 164-169. 10.1109/ICGCS.2010.5543076 (2010).

[5] I. T. Ardekani and W. H. Abdulla, "Adaptive active noise control in free space," 2013 *Asia-Pacific Signal and Information Processing Association Annual Summit and Conference*, Kaohsiung, 2013, pp. 1-4. doi: 10.1109/APSIPA.2013.6694354

In [1] a mechanism and implementation for active noise cancellation based on remote microphones and transmission of noise information over a wireless channel is disclosed. The goal is to remotely sense the source of noise, transmit it over a wireless channel to a headset. Due to the difference in propagation time between the electromagnetic wave and the audio wave, the headset has more time to generate the acoustic counter wave than if no remote microphone would be used. Their proposition is based on the use of headsets and is targeted at office environments. The evaluation shows that compared to more standard COTS ANC headphones, the proposed method achieves better noise reduction in high frequencies and it does not require the use of passive noise cancellation techniques.

Document [2] provides instances of active noise control (ANC) in the cabin of a mining truck, the wheelhouse of a patrol boar and the cabin of a locomotive. They discuss the practical issues of applying conventional ANC methods in such environments. This work does not propose how to utilize ANC methods in outside environments, such as nearby vertiports.

Document [3] discloses a diagonal recurrent extended Kalman filter (DREKF) method for nonlinearity from ANC in free space. The experiments show improved ANC performance over linear methods in compensating the secondary path nonlinearity.

Document [4] proposes strategies to further improve ANC performance and present challenges in applying ANC to real-world applications such as reducing noises from moving sources. The disclosure proposes virtual sensing, residual noise masking and active sound quality control techniques to advance ANC performance.

Document [5] proposes a novel algorithm to control the acoustic noise in free space. Their experimental set up indicates a noise reduction of 15 dB in free space.

US 2019/0 108 827 A1 discloses a control apparatus that can expand a range in which noise generated in an unmanned flying object is reduced.

US 2019/0 340 933 A1 discloses a transportation system for VTOL aircraft.

U.S. Pat. No. 9,646,597 B1 discloses a UAV emitting masking sounds in order to mask other sounds generated by the UAV during operation.

U.S. Pat. No. 10,453,473 B2 discloses an apparatus and method for reducing background noise captured by a UAV acoustic sensor.

In general, all these documents provide a useful analysis and algorithms to enable the use of ANC for various scenarios. However, the prior art lacks the ability to adapt ANC in a free space environment for aerial vehicles.

SUMMARY OF THE INVENTION

It is an object of the invention to improve and adapt noise cancellation capabilities of movable noise generation platforms for urban environments.

The object may be achieved by the subject-matter of one or more embodiment described herein. Preferred embodiments are also described in the following description.

The invention provides a method for active noise cancellation of noise generated by a noise generation platform that is capable of moving through an environment, the method comprising:

a) with a telemetry device that is disposed on the noise generation platform, obtaining motion related data of the noise generation platform, the motion related data being at least indicative of how and/or where the noise generation platform is moving through the environment;

b) sending the data obtained in step a) to a noise cancellation processing system via a communication infrastructure;

c) with the noise cancellation processing system, determining counterwave sound data based upon the data received in step b) and sending the counterwave sound data to an active noise cancelling device that is arranged within the environment;

d) with the active noise cancelling device, outputting the counterwave sound data as sound waves, so as to reduce the noise emanating from the noise generation platform within an area around the active noise cancelling device.

Preferably, in step a) the telemetry device obtains platform position as motion related data.

Preferably, in step a) the telemetry device obtains platform speed as motion related data.

Preferably, in step a) the telemetry device obtains platform acceleration as motion related data.

Preferably, in step a) the telemetry device obtains platform orientation as motion related data.

Preferably, in step a) the telemetry device obtains an operational state of a propulsion system as motion related data.

Preferably, in step a) the telemetry device obtains the rpm of a propulsion system as motion related data.

Preferably, in step a) the telemetry device obtains the power consumption of a propulsion system as motion related data.

Preferably, in step a), with at least one sensor that is disposed on the noise generation platform, the noise emanating from the noise generation platform is recorded, so as to obtain noise data.

Preferably, in step b) the communication infrastructure comprises any of a direct communication link, a communication network, a mobile device network, a Wi-Fi.

Preferably, step b) comprises sending exclusively the motion related data.

Preferably, in step c) the active noise cancelling device further comprises at least one sensor and with the sensor records a noise profile that results from the noise and the counterwave, in order to obtain error data.

Preferably, the active noise cancelling device sends the error data to the noise cancellation processing system, and the noise cancellation processing system modifies the counterwave sound data based on the error data, so as to reduce the amount of noise.

Preferably, the active noise cancelling device is disposed stationary within the environment.

Preferably, in step c) the noise cancellation processing system determines the counterwave sound data also based on environmental data that is indicative of propagation properties of a sound wave.

Preferably, the environmental data is received from the communication infrastructure.

Preferably, the noise cancellation processing system includes a platform unit that is disposed on the noise generation platform and/or a stationary unit. Preferably, the stationary unit determines the counterwave sound data, if the distance between the noise generation platform and the active noise cancelling device, that is to receive the counterwave sound data, is greater than a predetermined threshold, otherwise the platform unit is used to determine the counterwave sound data.

Preferably, the noise cancellation processing system is communicating with a traffic management system that is configured for managing traffic of a plurality of noise generation platforms. Preferably, if the noise cancellation processing system determines that a noise reduction is below a predetermined threshold, the noise cancellation processing system sends a message to the traffic management system, the message having control data for controlling motion of a noise generation platform, and the control data being configured such that noise emanating from the noise generation platform is reduced at the location of the active noise cancelling device.

Preferably, the noise generation platform is a ground vehicle or an aerial vehicle.

The invention provides a system for active noise cancellation of noise that is generated by a noise generation platform that is capable of moving through an environment, the system comprising:

a noise generation platform that generates noise when being operated and that comprises a telemetry device configured for obtaining motion related data of the noise generation platform, the motion related data being at least indicative of how and/or where the noise generation platform is moving through the environment, and a communication device configured for sending the noise data to a noise cancellation processing system via a communication infrastructure;

a noise cancellation processing system that is configured for determining counterwave sound data based upon the data received from the noise generation platform and for sending the counterwave sound data to an active noise cancelling device; and an active noise cancelling device that is arranged within the environment and that is configured for outputting the counterwave sound data as sound waves, so as to reduce the noise emanating from the noise generation platform within an area around the active noise cancelling device.

Preferably, the noise generation platform is configured for additionally obtaining motion related data of the noise generation platform, such as motion direction and/or motion speed.

Preferably, the communication infrastructure comprises any of a direct communication link, a communication network, a mobile device network, a Wi-Fi.

Preferably, the noise generation platform comprises at least one sensor configured for recording noise emanating from the noise generation platform, so as to obtain noise data.

Preferably, the active noise cancelling device further comprises at least one sensor and is configured for recording, with the sensor, a noise profile that results from the noise and the counterwave, in order to obtain error data.

Preferably, the active noise cancelling device sends the error data to the noise cancellation processing system, and the noise cancellation processing system modifies the counterwave sound data based on the error data, so as to reduce the amount of noise.

Preferably, the active noise cancelling device is disposed stationary within the environment.

Preferably, the noise cancellation processing system determines the counterwave sound data also based on environmental data that is indicative of propagation properties of a sound wave.

Preferably, the environmental data is received from the communication infrastructure.

Preferably, the noise cancellation processing system includes a platform unit that is disposed on the noise generation platform and/or a stationary unit. Preferably, the stationary unit determines the counterwave sound data, if the distance between the noise generation platform and the active noise cancelling device, that is to receive the counterwave sound data, is greater than a predetermined threshold, otherwise the platform unit is used to determine the counterwave sound data.

Preferably, the noise cancellation processing system is communicating with a traffic management system that is configured for managing traffic of a plurality of noise generation platforms. Preferably, if the noise cancellation processing system determines that a noise reduction is below a predetermined threshold, the noise cancellation processing system sends a message to the traffic management system, the message having control data for controlling motion of a noise generation platform, and the control data being configured such that noise emanating from the noise generation platform is reduced at the location of the active noise cancelling device.

Preferably, the noise generation platform is a ground vehicle or an aerial vehicle.

The invention provides a computer program, a machine readable storage medium, or a data carrier signal that comprises instructions that, upon execution on a data processing device, cause the data processing device to perform one, some, or all of the steps of a preferred method.

Aerial vehicles are non-stationary noise sources. Furthermore, the invention can utilize flight-related parameters in order to dynamically predict and cancel the noise at the receiver.

In order to reduce noise generated by flying vehicles and related modes of transportation, noise reduction methods may be used to reduce the noise disturbance generated by the current propulsion systems of flying vehicles. Current solutions for noise reduction work by generating counteracting acoustic waves which result in (partial) cancellation of the acoustic wave of the noise. To improve the generation of this noise canceling wave or sound counterwave, additional information about the noise generating object(s) may be used such as flying path, position, speed, or rotors speed. Furthermore, such parameters can be useful for noise cancellation in multi-source environments such as simultaneous flying taxi operations around vertiports.

Thanks to the lowered noise disturbance provided by the invention, flying taxis may be more widely accepted in densely populated cities, potentially generating more demand for such modes of transportation.

This invention may also enable the commercialization of dedicated noise reduction apparatus at vertiports or in cities where flying taxis are operated. It may also enable to operate takeoff/landing during times that are otherwise restricted due to noise, e.g. during night. Additionally, it may also reduce noise generated by other types of vehicles, such as high speed trains.

Additionally, flying vehicles with lower noise profiles might be able to fly and operate at lower altitudes during cruise flight. This means that less energy would be needed to attain a given cruise altitude, potentially resulting in either reduced weights for the flying vehicles due to the reduced needs of energy storage, or increased flight times.

This invention proposes improvements of noise reduction methods for urban air mobility and similar use cases, where the noise can be generated by urban aircraft (flying taxi), high speed trains compositions, etc.

The invention may comprise sensors installed on the noise generation platform (NGP) that records a set of parameters and distributes them to the noise cancellation processing system. This can include an array of microphones installed on the NGP.

Furthermore, a communication infrastructure (CI) enables digital communication between the NGP and the noise cancellation processing system, which includes a wireless segment and fixed network on the ground.

An active noise cancellation system (ANCS) may employ an array of loudspeakers and is preferably located primarily in areas where the noise reduction has to be achieved.

The noise cancellation processing system (NCPS) is a computing device that processes the received information and sends instructions to the ANCS to generate cancelling acoustic waveforms.

Optionally, additional sensors on the ground or on the NGP can be provided. The noise generation platform (NGP) can represent any type of vehicle such as urban aircraft, unmanned aerial vehicles (drones), and train compositions among others.

The NGP is preferably equipped with a microphone array that will record the noise profile generated by the platform in its vicinity. The microphone array is configured to cover the complete surface of the platform and record the noise profile in any direction. The area, where the noise cancellation effect has to be achieved, may change depending on the vehicle trajectory.

The NGP can also be adapted for reporting generalized telemetry data in terms of direction (3D in case of aerial vehicle) and speed, so that the NCPS can estimate the future location of the NGP in the time domain.

The active noise cancellation system (ANCS) may include an array of loudspeakers on the ground with the primary task to generate cancelling acoustic sound waves. These arrays can be installed in open space locations (i.e. outside of buildings) or inside buildings. Furthermore, the ANCS can be augmented with an additional set of microphone arrays collocated with the ANCS, so they can record the received noise profile and feed this information back to the NCPS for error correction analysis.

The communication infrastructure (CI) is adapted to interconnect the different members of the system and ensures the timely delivery of the information. For example, it can be either implemented with direct communication links between the NGP and the NCPS in case both are close to each other (vertiports, train stations, etc.) or via a communication network (mobile network, Wi-Fi, etc.). Furthermore, it can be adapted to deliver information from other services that can improve the operation of the NCPS, for example by providing weather information, as the weather affects the propagation properties of the sound waves.

The noise cancellation processing system (NCPS) can be a data processing device for computation in the system. It preferably takes as an input the noise profiles generated by NGPs, their telemetry data, any other information, such as current weather data, that is relevant to the calculation of the counter acoustic wave generation. It can also use the recorded noise profile at the ANCS, so it can apply error-correction methods.

Due to the difference in propagation speed of acoustic and electromagnetic waves, information about the noise generated by a NGP can be sent over a CI, and arrive in advance of the acoustic wave. This potentially leaves more time for the noise reduction apparatus to process (NCPS) and generate (ANCS) a proper cancelling acoustic wave. The proposed method uses a communication infrastructure in order to provide that information to the noise cancellation apparatus in advance of the acoustic wave.

In numerical terms, an acoustic wave takes approximately 2.9 ms to travel 1 meter (using the sound propagation speed of 340.27 m/s). This means that for a flying vehicle with a cruise altitude of 300 m to 1000 m, the noise generated by the rotors takes approximately from 870 ms to 2.9 s to reach the ground. Using recent communication infrastructure such as 4G or 5G networks, this information can be sent in less than 100 ms. This leaves the computing element at the ground station at least 700 ms to process the information and generate an appropriate acoustic counterwave.

The method for actively cancelling noise of the NGP works as follows:

The noise generated by the NGP is recorded by the microphone arrays on the platform. Additional information about the NGP may also be used such as rotors speed, vehicle position and speed vector, type of motor, etc. This information is transmitted from the NGP via the CI to the NCPS for processing. Additionally current weather information may also be used, since the sound propagation in the air is influenced by the temperature, atmospheric pressure, or air humidity. All this information is processed by the NCPS using either traditional algorithms or a machine learning-based approach where a neural network is trained to generate an appropriate counterwave. The location of NCPS can be: 1) centralized in case the NGP position is far away (more than 500 m) with respect to the area where the noise cancellation effect has to be achieved (cruise phase of air taxi); 2) collocated with ANCS in case the distance between the NGP and ANCS is lower than 500 m (for example vertiports).

Once the NCPS processes the all acquired information, it instructs the ANCS to generate appropriate sound counterwaves. The NCPS system can also have an interface to a traffic management system in order to propose a new trajectory or change of the speed for the NGP. This can be required in case the noise cannot be reduced to the desired levels.

BRIEF DESCRIPTION OF THE DRAWINGS

Embodiments of the invention are described in detail with reference to the accompanying drawings. Therein:

The FIGURE depicts an embodiment of the system for active noise cancellation according to the invention.

DETAILED DESCRIPTION OF THE PREFERRED EMBODIMENTS

As depicted in the FIGURE a system 10 for active noise cancellation comprises at least one noise generation platform 12. The noise generation platform 12 can be configured as a ground vehicle, such as a high speed train, or an aerial vehicle that is adapted for urban air mobility, such as an air-taxi.

The noise generation platform 12 may comprise a sensor 14 that is configured for recording noise emanating from the noise generation platform 12 and converts the noise into noise data 13. The sensor 14 is configured such that the noise data 13 can be collected in every direction. The sensor 14 may comprise an array of microphones or other acoustic sensors that are distributed on the noise generation platform 12 to cover every direction.

The noise generation platform 12 may comprise a telemetry device 16 that is capable of recording motion related data (such as speed, direction, etc.) or other operation related data (i.e. data that is not motion related).

The noise generation platform 12 has a communication device 18, that is capable of sending and receiving messages via a communication infrastructure 20. The communication device 18 is adapted to work with the communication infrastructure 20.

The system 10 further comprises the communication infrastructure 20 that enables fast communication between the components of the system 10. The communication infrastructure 20 can be configured as a direct connection link, a Wi-Fi network, a mobile network, or other wireless network with high data transmission rates. The mobile network can be configured according to the 4G or 5G standards or any other standard allowing for high-speed data transmission. The communication infrastructure 20 can be connected to other data sources or services 22, so as to provide further information that is related to the propagation properties of sound waves, such as weather conditions.

The system 10 comprises a noise cancellation processing system 24. The noise cancellation processing system 24 is configured as a computing device for determining counterwave sound data 25 that allow for, ideally, extinction of the noise emanating from the noise generation platform 12. The noise cancellation processing system 24 can be configured as a centralized stationary unit 26 that is arranged away from the noise generation platform 12. Alternatively, the noise cancellation processing system 24 can be configured as a distributed system having multiple units of which at least one is a stationary unit 26 and at least one is a platform unit 28 that is disposed on the noise generation platform 12. The noise cancellation processing system 24 may use a conventional generation method for generating the counterwave sound data 25 or a machine-learning based method.

The machine-learning based method can be trained by letting the noise generation platform 12 operate in different phases, such as starting, cruising, or landing, and performing a training method such as Q-learning, a genetic algorithm, or the like to configure the noise cancellation processing system 24 to generate counterwave sound data 25 that are adapted to reduce the noise of the noise generation platform 12.

The system 10 further comprises a plurality of active noise cancellation devices 30 that are distributed in an environment 32, through which the noise generation platform 12 is about to move. In case of the ground vehicle, for example, the active noise cancellation devices 30 are distributed along roads, streets or rails and are arranged at typical stopping points. In case of the aerial vehicle, the active noise cancellation devices 30 are similarly distributed along the flight paths through an urban environment, i.e. along the streets, and at typical landing points such as vertiports.

The active noise cancelling device 30 comprises at least one sound emitter 34 that is capable of emitting a sound wave that is effective within a predetermined area 36 around the active noise cancelling device 30. The active noise cancelling device 30 is configured for receiving the counterwave sound data 25 and emitting a sound counterwave based thereon.

The active noise cancelling device 30 may further comprise a sensor 33 that is configured similar as the sensor 14. The active noise cancelling device 30 is configured to record a residual noise profile that remains when the noise emanating from the noise generation platform 12 and the sound counterwave are actually superposed. The residual noise profile can be converted into error data 37 that are subsequently transmitted by the active noise cancelling device 30 to the noise cancellation processing system 24. The noise cancellation processing system 24 can be configured for modifying the counterwave sound data 25 based on the error data 37, so as to further reduce the residual noise profile.

It is also possible, that the noise cancellation processing system 24 is further configured to determine that the residual noise profile is still above a predetermined threshold, and therefore insufficient. In this case, the noise cancellation processing system 24 may generate control data 38 that is configured to control the noise generation platform 12. The control data 38 can be generated using a noise generation model of the noise generation platform 12 and/or again a machine-learning method. The control data 38 can then be sent to a traffic management system 40 that is configured to route the control data 38 to the noise generation platform 12.

Subsequently, a method for active noise cancellation is described for different phases of operation of the noise generation platform 12. For the sakes of brevity and illustration, the method will be described with reference to an aerial vehicle in an urban environment, such as an air taxi. It should be noted that the method is also applicable for other movable noise generation platforms, such as ground vehicles, e.g. high speed trains.

Initially, the aerial vehicle is at rest at a vertiport. The vertiport has multiple active noise cancellation devices 30 arranged in its vicinity. Further active noise cancellation devices 30 are arranged along the flight path of the aerial vehicle and fixed to buildings, for example.

When the aerial vehicle is taking off, the noise emanating from the aerial vehicle is recorded by the sensors 14 and 34. The sensors 14 convert the noise to noise data 13 that are sent to the platform unit 28 of the noise cancellation processing system 24 in order to avoid too long a signal runtime to a stationary unit 26. The noise cancellation system 24 determines the counterwave sound data 25 that are sent to the active noise cancellation devices 30 at the vertiport. Thereby, the starting noise is reduced.

When the aerial vehicle transitions into cruising mode and starts moving along a trajectory, the speed and direction of motion are also sent by the noise generation platform 12 to the noise cancellation processing system 24. If the aerial vehicle reaches an acceptable distance (less than 500 m, for example) to a stationary unit 26 of the noise cancellation processing system 24, then the noise data 13 are no longer processed by the platform unit 28 but by the stationary unit 26.

The noise cancellation processing system 24 continuously generates counterwave sound data 25 based on the speed, direction and environmental conditions that influence noise propagation properties. Depending on the speed and direction, the appropriate active noise cancellation devices 30 receive the counterwave sound data 25 and emit sound waves that are adapted to reduce the noise emanating from the aerial vehicle.

If for some reason, the noise cancellation processing system 24 determines that an expected reduction in noise in a specific area 36 is insufficient, i.e. below a predetermined threshold, the noise cancellation processing system 24 generates control data 38, that may cause a change of altitude, speed, direction, or any other flight parameter that influences the noise level. The control data 38 are sent to the traffic management system 40. The traffic management system 40 that manages the flight parameters of all connected aerial vehicles, determines if and which change of flight parameters is executed. For example, the traffic management system 40 may determine that climbing to a higher altitude would reduce the noise and not interfere with other aerial vehicles. Then the appropriate command is sent to the aerial vehicle causing it to climb, thereby reducing noise.

When the aerial vehicle is landing at another vertiport, the method for the starting phase is essentially repeated in opposite sequence.

In order to improve and adapt noise cancellation capabilities of movable noise generation platforms (12) for urban environments (32), the invention proposes an active noise cancellation method in which the noise generation platform (12) records noise data (13) with an array of microphones and sends that noise data (13) to a noise cancellation processing system (24). The noise data (13) is converted to counterwave sound data (25) that are again converted by stationary loudspeaker arrays into sound counterwaves with the potential to eliminate or at least reduce the noise from the noise generation platform (12). The noise generation platform (12) may be an aerial vehicle or a ground vehicle, such as a high-speed train.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

10 system
12 noise generation platform
13 noise data
14 sensor
16 telemetry device
18 communication device
20 communication infrastructure
22 other data sources or services
24 noise cancellation processing system
25 counterwave sound data
26 stationary unit
28 platform unit
30 active noise cancellation devices
32 environment
33 sensor
34 sound emitter
36 area
37 error data
38 control data
40 traffic management system

The invention claimed is:

1. A method for active noise cancellation of noise generated by a noise generation platform configured to move through an environment, the method comprising:

a) with a telemetry device disposed on the noise generation platform, obtaining motion related data of the noise generation platform, the motion related data being at least indicative of how, or where, or how and where the noise generation platform is moving through the environment;

b) sending the motion related data obtained in step a) to a noise cancellation processing system via a communication infrastructure;

c) with the noise cancellation processing system, determining a counterwave sound data based upon the motion related data received in step b) and sending the counterwave sound data to an active noise cancelling device arranged within the environment wherein the active noise cancelling device further comprises at least one sensor and with the at least one sensor records a noise profile that results from the noise and the counterwave, in order to obtain error data, wherein the active noise cancelling device sends the error data to the noise cancellation processing system, and wherein the noise cancellation processing system modifies the counterwave sound data based on the error data, so as to reduce the amount of noise; and, d) with the active noise cancelling device, outputting the counterwave sound data as sound waves, so as to reduce the noise emanating from the noise generation platform within an area around the active noise cancelling device, wherein the noise cancellation processing system includes a platform unit that is disposed on the noise generation platform and a stationary unit, wherein the stationary unit is configured to determine the counterwave sound data, when a distance between the noise generation platform and the active noise cancelling device, that is to receive the counterwave sound data, is greater than a predetermined threshold, and wherein the platform unit is configured to determine the counterwave sound data when the distances is less than the predetermined threshold.

2. The method according to claim 1, wherein in step a), with at least one sensor disposed on the noise generation platform, the noise emanating from the noise generation platform is recorded, so as to obtain noise data.

3. The method according to claim 1, wherein in step b) the communication infrastructure comprises any of a direct communication link, a communication network, a mobile device network, or a Wi-Fi.

4. The method according to claim 1, wherein the active noise cancelling device is disposed stationary within the environment.

5. The method according to claim 1, wherein in step c) the noise cancellation processing system determines the counterwave sound data also based on an environmental data indicative of propagation properties of a sound wave.

6. The method according to claim 1, wherein the noise cancellation processing system is communicating with a traffic management system configured for managing traffic of a plurality of noise generation platforms, wherein, when the noise cancellation processing system determines that a noise reduction is below a predetermined threshold, the noise cancellation processing system sends a message to the traffic management system, the message having control data for controlling motion of a noise generation platform, and the control data being configured such that noise emanating from the noise generation platform is reduced at a location of the active noise cancelling device.

7. The method according to claim 1, wherein the noise generation platform comprises a ground vehicle or an aerial vehicle.

8. A non-transitory computer readable medium comprising:

a computer program that comprises instructions that, upon execution by a data processing device, cause the data processing device to perform one, some, or all of the steps of the method according to claim 1.

9. A system for active noise cancellation of noise generated by a noise generation platform configured to move through an environment, the system comprising:

a noise generation platform that generates noise when being operated and that comprises a telemetry device configured for obtaining motion related data of the noise generation platform, the motion related data being at least indicative of how, or where, or how and where the noise generation platform moves through the environment, and a communication device configured for sending the data to a noise cancellation processing system via a communication infrastructure;

a noise cancellation processing system configured for determining a counterwave sound data based upon the motion related data received from the noise generation platform and for sending the counterwave sound data to an active noise cancelling device; and an active noise cancelling device arranged within the environment and configured for outputting the counterwave sound data as sound waves, so as to reduce the noise emanating from the noise generation platform within an area around the active noise cancelling device, wherein the active noise cancelling device further comprises at least one sensor and is configured for recording, with the at least one sensor, a noise profile that results from the noise and the counterwave, in order to obtain error data, wherein the noise cancellation processing system comprises a platform unit disposed on the noise generation platform and a stationary unit, wherein the stationary unit is configured to determine the counterwave sound data, when a distance between the noise generation platform and the active noise cancelling device, that is to receive the counterwave sound data, is greater than a predetermined threshold, and, wherein the platform unit is configured to determine the counterwave sound data when the distance is less than the predetermined threshold.

10. The system according to claim 9, wherein the noise generation platform comprises at least one sensor configured for recording noise emanating from the noise generation platform, so as to obtain noise data.

11. The system according to claim 9, wherein the active noise cancelling device is disposed stationary within the environment.

12. A method for active noise cancellation of noise generated by a noise generation platform configured to move through an environment, the method comprising:

a) with a telemetry device disposed on the noise generation platform, obtaining motion related data of the noise generation platform, the motion related data being at least indicative of how, or where, or how and where the noise generation platform is moving through the environment;

b) sending the motion related data obtained in step a) to a noise cancellation processing system via a communication infrastructure;

c) with the noise cancellation processing system, determining a counterwave sound data based upon the motion related data received in step b) and sending the counterwave sound data to an active noise cancelling device arranged within the environment; and, d) with the active noise cancelling device, outputting the counterwave sound data as sound waves, so as to reduce the noise emanating from the noise generation platform within an area around the active noise cancelling device, wherein the noise cancellation processing system includes a platform unit that is disposed on the noise generation platform and a stationary unit, wherein the stationary unit is configured to determine the counterwave sound data, when a distance between the noise generation platform and the active noise cancelling device, that is to receive the counterwave sound data, is greater than a predetermined threshold, and wherein the platform unit is configured to determine the counterwave sound data when the distances is less than the predetermined threshold.

* * * * *